(12) United States Patent
Pickering

(10) Patent No.: US 6,882,973 B1
(45) Date of Patent: Apr. 19, 2005

(54) SPEECH RECOGNITION SYSTEM WITH BARGE-IN CAPABILITY

(75) Inventor: John Brian Pickering, Winchester (GB)

(73) Assignee: International Business Machines Corporation, Armonk, NY (US)

(*) Notice: Subject to any disclaimer, the term of this patent is extended or adjusted under 35 U.S.C. 154(b) by 501 days.

(21) Appl. No.: 09/696,485

(22) Filed: Oct. 25, 2000

(30) Foreign Application Priority Data

Nov. 27, 1999 (GB) ................................. 9928011

(51) Int. Cl.7 ............................................. G10L 21/06
(52) U.S. Cl. ..................... 704/270; 704/235; 704/256; 704/275; 379/88.02
(58) Field of Search ............................. 704/235, 256, 704/270, 275, 233; 379/88.02

(56) References Cited

U.S. PATENT DOCUMENTS

| | | | | |
|---|---|---|---|---|
| 5,475,791 A | * | 12/1995 | Schalk et al. | ............... 704/256 |
| 6,311,159 B1 | * | 10/2001 | Van Tichelen et al. | ..... 704/275 |
| 6,314,402 B1 | * | 11/2001 | Monaco et al. | ............. 704/275 |
| 6,427,134 B1 | * | 7/2002 | Garner et al. | ............... 704/233 |

* cited by examiner

Primary Examiner—Susan McFadden
(74) Attorney, Agent, or Firm—Michael P. Adams; Winstead Sechrest & Minick P.C.

(57) ABSTRACT

A voice processing system includes a speech recognition facility with barge-in. The system plays out a prompt to a caller, who starts to provide their spoken response while the prompt is still being played out. The system performs speech recognition on this response to determine a corresponding text, which is then subjected to lexical analysis. This tests whether the text satisfies one or more conditions, for example, including one or more words from a predefined set of task words. If this is found to be the case, the playing out of the prompt is terminated (i.e. barge-in is effected); otherwise, the playing out of the prompt is continued, essentially as if the caller bad not interrupted.

27 Claims, 2 Drawing Sheets

US 6,882,973 B1

SPEECH RECOGNITION SYSTEM WITH BARGE-IN CAPABILITY

TECHNICAL FIELD

The present invention relates to voice processing systems and the like, and more particularly to voice processing systems that use speech recognition.

BACKGROUND INFORMATION

Voice processing systems whereby callers interact over the telephone network with computerized equipment are very well-known in the art, and include voice mail systems, voice response units, and so on. Typically, such systems ask a caller (or called party) questions using prerecorded prompts, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use speech recognition in order to augment DTMF input (the terms "speech recognition" and "voice recognition" are used interchangeably herein to denote the act of converting a spoken audio signal into text). The utilization of speech recognition permits the handling of callers who do not have a DTMF phone, and also the acquisition of more complex information beyond simple numerals from the caller.

As an illustration of the above, PCT WO96/25733 describes a voice response system which includes a prompt unit, a Voice Activity Detector (VAD), and a voice recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the recognition unit, thereby providing a bargain facility.

Speech recognition in a telephony environment can be supported by a variety of hardware architectures. Many voice processing systems include a special digital signal processing (DSP) card for running speech recognition software. This card is connected to a line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor Integration Protocol (MVIP). A somewhat different configuration is described in GB 2280820, in which a voice processing system is connected via a local area network to a remote server, which provides a speech recognition facility. This approach is somewhat more complex than the TDM approach, given the data communication and management required, but does offer significantly increased flexibility.

Speech recognition systems are generally used in telephony environments as cost-effective substitutes for human agents, and are adequate for performing simple, routine tasks. It is important that such tasks are performed accurately, otherwise there may be significant caller dissatisfaction; and also as quickly as possible, both to improve caller throughput, and because the owner of the voice processing system is often paying for the call via some FreePhone mechanism (e.g., a 1-800 number), or because an outbound application is involved.

(Note that as used herein, the term "caller" simply indicates the party at the opposite end of a telephone connection to the voice processing system, rather than to specify which party actually initiated the telephone connection.)

One facility in prior art voice processing systems to help accelerate call handling and also to improve the user interface is barge-in. As briefly indicated above, this is where voice recognition is enabled on an incoming channel at the same time as the system is playing a prompt on the corresponding outgoing channel. This allows a caller to interrupt the prompt as soon as they know what response to give. For example, if the prompt is "Say Account for account information, say Order to order material, or say Transfer to speak to an operator", and the caller wants account information, barge-in allows the caller to interrupt the prompt by saying "Account" before the complete prompt has finished. This is particularly useful for regular callers who are familiar with the application and the prompt menus. Following such an interruption, the application abandons the rest of the prompt and the caller interruption is passed to the recognition system for processing. The application can then proceed further on the basis of what is returned from the recognition system.

One problem with prior art barge-in systems is that they can be confused by noise on the telephone line. For example, if the caller coughs, the outgoing prompt may be suspended even though the caller actually still desires to hear the rest of the prompt. This can leave a very awkward situation, with the machine expecting further input from the caller, and the caller expecting further output from the machine. The result can be a suspended or confused dialogue with the caller, resulting ultimately in a wasted or highly ineffective call.

A known solution to this for discrete word (small vocabulary) recognition systems, which typically only recognize one or two dozen different inputs (e.g., numerals 0–9), is to wait for the recognition result to be returned before interrupting the outgoing prompt. Thus, if the supposed caller input is not recognized, perhaps because it is noise or some irrelevant caller interjection, then the play out of the prompt is continued. In other words, the prompt is only interrupted where there is a successful recognition result.

Although this approach which essentially involves modelling the recognition system and application to the likely range of caller responses is effective for discrete word systems, more modern voice processing applications often involve large vocabulary speech recognition for which such modelling is not feasible. For these applications, the provision of barge-in is prone to trigger the termination of the prompt even in circumstances where this was not actually the intention of the caller.

SUMMARY OF THE INVENTION

Accordingly, the present invention provides a method of providing speech recognition with barge-in for a voice processing system. The method plays out a prompt to a user, receives audio input from the user while the prompt is still being played out, performs speech recognition on the audio input to determine a corresponding text, performs lexical analysis on the text to determine whether or not the text satisfies one or more conditions, and responsive to the text satisfying the one or more conditions, terminating the play out of the prompt, otherwise, continuing the play out of said prompt.

The voice processing system is allowed to assess whether or not to give effect to barge-in, and interrupt the outgoing prompt, based on an analysis of what has actually been said. In particular, this allows the system to discriminate some background comment, whether by the user or someone with them, from a positive response to the prompt. Thus, where the input is determined to be not relevant to the prompt, the play out of the prompt is continued, and the user is not left accidentally suspended in an application script. In this case, the recognized text can generally be discarded as irrelevant to the actual dialogue between the user and the voice processing system.

In one embodiment, the lexical analyzer determines whether or not the response is relevant to the prompt by scanning the text to see if it contains one or more predetermined words (note that the list of possible words to be matched may vary with each prompt). For instance, if a U.S. caller is asked to name the state in which they live, the lexical analyzer may simply be provided with a list of 50 states to match dynamically.

Although this positive matching of text with a predefined set of words is a convenient approach to take, in other cases, a different strategy may be appropriate. For example, if a caller is being asked to input their name, and the lexical analyzer determines that the first two words they input are both dictionary words, it may consider it most probable that the response so far does not in fact represent their name, and so will not give effect to barge-in.

In some embodiments, one or more acoustic parameters may also be used as a secondary measure for determining whether to continue or to terminate playing out of the prompt. For example, it may be desirable to refrain from effecting barge-in if the audio input is muted or highly variable in volume, this being taken as an indication that the input is not in fact intended as an answer to the prompt.

Typically, the voice processing system and the user or caller communicate with each other over a telephone network. Thus, the prompt is played out over a telephone connection, and the audio input is received back over the telephone connection.

The present invention further provides a voice processing system for providing speech recognition with barge-in, the voice processing system including means for playing out a prompt to a user, means for receiving audio input from the user while the prompt is still being played out, means for performing speech recognition on the audio input to determine a corresponding text, means for performing lexical analysis on the text to determine whether or not the text satisfies one or more conditions, and means responsive to the text satisfying the one or more conditions, for terminating the playing out of the prompt, otherwise, for continuing the playing out of the prompt.

Such a voice processing system may be adapted for connection to the telephone network (conventional PSTN or the Internet), in a customer server kiosk, or in any other appropriate device. Note that the speech recognition means and/or the lexical analysis may or may not be integral to the voice processing system itself (as will be apparent more clearly from the embodiments described below).

The present invention further provides a computer readable medium containing computer program instructions for a voice processing system for providing speech recognition with barge-in, the computer program instructions playing out a prompt to a user, receiving audio input from the user while the prompt is still being played out, performing speech recognition on the audio input to determine a corresponding text, performing lexical analysis on the text to determine whether or not the text satisfies one or more conditions, and responsive to the text satisfying the one or more conditions, terminating the playing out of the prompt, otherwise, continuing the playing out of the prompt.

The computer readable medium may comprise a magnetic or optical disk, solid state memory device, tape, or other appropriate storage apparatus. In some cases this medium may be physically loadable into the storage device. In other cases, this medium may be fixed in the voice processing system, and the instructions loaded onto the medium via some wired or wireless network connection. Another possibility is for the medium to be remote from the voice processing system itself, with the instructions being downloaded over a wired or wireless network connection for execution by the voice processing system.

It will be appreciated that the computer program and apparatus of the invention will benefit from substantially the same features as the method of the invention.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

An embodiment of the invention will now be described in detail by way of example only with reference to the following drawings.

DETAILED DESCRIPTION

Figure 1:
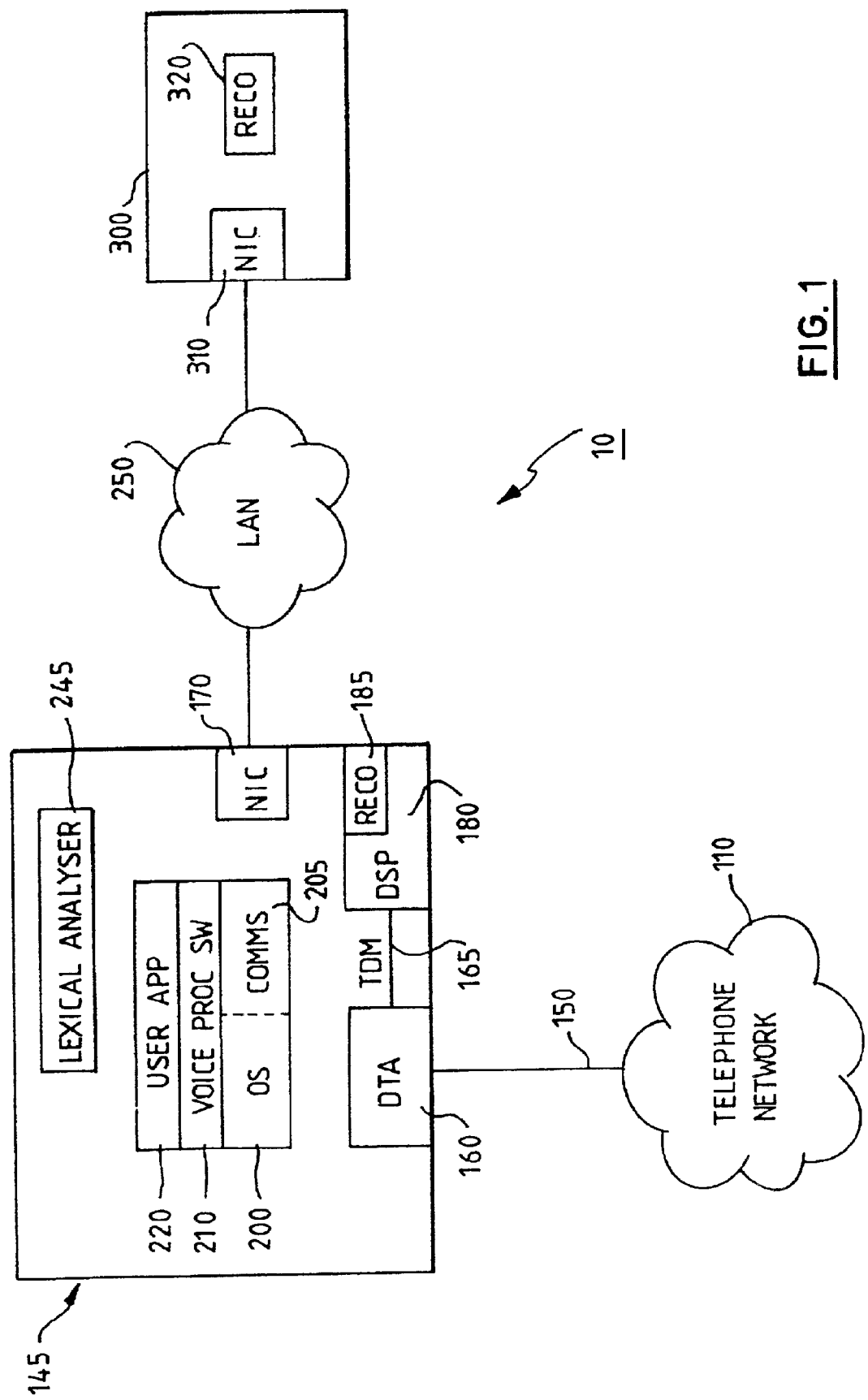
FIG. 1 is a simplified schematic diagram of a voice processing system connected to a remote server.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates in simplified schematic form the main hardware and software components of a voice processing system 10 having speech recognition functionality. The system 10 is connected to the telephone network 110 by one or more telephony channels 150. In FIG. 1 these are digital trunk lines, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system 10 to be a part of the telephone network 110 itself, providing intelligent services to the network 10.

The system unit 145 of the voice processing system 10 comprises a computer workstation, which runs an appropriate operating system (OS) 200 and a voice processing program (VOICE PROC SW) 210, which in turn interacts with a user application (APP) 220 in order to determine how calls should be processed. The voice processing platform also supports a lexical analyzer 245, the purpose of which will be described in more detail below. The system unit 145 includes one or more digital trunk adapter (DTA) cards 160 for interfacing to the telephone network 110 via link 150. The system unit 145 also contains a network interface card (NIC) 170 which allows programs running on the workstation to communicate over a local area network (LAN) 250, using communications software (COMMS) 205 incorporated into the operating system 200. In addition, the system unit 145 includes a digital signal processing (DSP) card 180, which is connected to the trunk adapter (or adapters) 160 via a time division multiplex (TDM) bus 165. Speech recognition software (RECO) 185 may be installed as microcode or firmware on the DSP card 180.

The adapter cards 160 are responsible for interfacing with the telephone network 110 over their respective lines 150, including signalling, demultiplexing incoming telephony signals, and so on. They may also be used to perform activities such as voice activity detection on a particular telephony channel, compression/decompression of voice signals, and DTMF recognition and generation, although these may be performed on the DSP card 180 instead.

A server system 300 is attached to the LAN 250 via network interface card (NIC) 310, and supports an operating system and appropriate communications software (not shown), and speech recognition software (RECO) 320. It will be appreciated therefore that there are two voice recognition resources available to the application 220, the first of these being locally installed on the DSP card 180 in the system unit 145, and the second voice recognition resource being available remotely via the LAN 250 on server 300.

In one embodiment, the voice processing system 10 is the IBM Voice Response unit (previously known as the DirectTalk voice processing system) available from the IBM Corporation, running on an RS/6000 workstation on top of the AIX operating system. The voice recognition resource comprises a large vocabulary voice recognition system and may, for example, be the ViaVoice engine, available from IBM Corporation. PC-based systems are also available.

It will be appreciated that there are many possible variations in the design of the voice processing system 10 of FIG. 1. For example, some voice processing systems accept input from analog lines rather than digital trunks, while other voice processing systems are connected to the Internet instead of, or as well as, the conventional telephone network (this provides Voice over IP capability). Some voice processing systems may package the DSP card 185 as a daughter card of the digital trunk adapter 160, thereby eliminating the need for the TDM bus 165. In addition, the illustrated system 10 has access both to a server voice recognition system 320, and also to a local DSP recognition system 185, whereas many voice processing systems will have access to only one such resource. Further, any suitable network could be used for communications between the server 300 and the voice processing system, providing it has suitable transmission characteristics in terms of bandwidth and latency (e.g., one possibility might be to use an ATM connection). Additionally, although the voice processing system illustrated has just a single local DSP resource, some voice processing systems may include multiple DSP cards, with each card supporting multiple recognition programs running simultaneously. Moreover, although the server approach as shown has the recognition system installed on a separate machine from the line interface unit 160, it would clearly be possible for the software recognition system to be running on the same machine 145 as the line interface unit 160, provided this machine had sufficient processing capability. Conversely, the lexical analyzer 245 could run on a separate system from system unit 145, for example, on system 300, or possibly on some other system (not shown) connected to LAN 250. The skilled person will appreciate that such variations are not pertinent to the principles of the present invention.

A typical operation of the voice processing system 10 of FIG. 1 is as follows. An incoming call is received over the telephony network 110, and the voice processing system 10, under the control of the user application 220, may determine that the caller does not have a DTMF telephone (this determination can be made for example through knowledge of the calling or called number, or by the caller failing to depress a tone key when requested to do so). Alternatively, the machine may be configured to use voice recognition for all callers. In any event, the voice processing system 10 proceeds to utilize voice recognition to interpret the caller's input. This is done by forwarding the appropriate audio signal to a speech recognition resource. For use of the local resource, this leads to a channel on the trunk adapter 160 being connected with a channel on the DSP card 180 via the TDM bus 165. Access to the remote resource 320 can be achieved for example using the approach described in GB 2325110, which is incorporated herein by reference. (Note that the TDM bus connection 165 as shown in FIG. 1 provides a uni-directional data flow, so that as is well-known in the art, a pair of such connections are needed to support a full duplex telephone conversation).

The speech recognition system processes the received audio signal and returns the spoken string to the user application 220. It will be noted that the large majority of voice recognition systems used in telephony are speaker independent; in other words, such systems are trained to recognize vocal input from any speaker. This is accomplished by training the machine on vocal samples from a representative set of speakers. In general, the recognition may also return other information in addition to the recognized string, for example, a statistical confidence level, possible alternative results, and so on. The user application will then further process the call in accordance with the returned recognition result. For example, if the caller has spoken a numerical sequence corresponding to an account number, it may provide the caller with the ability to access account information; if the caller has spoken a particular name, it may transfer the caller to the telephone extension for that name. If the recognition fails, the caller may be asked to repeat the input, or transferred to a human operator.

Figure 2:
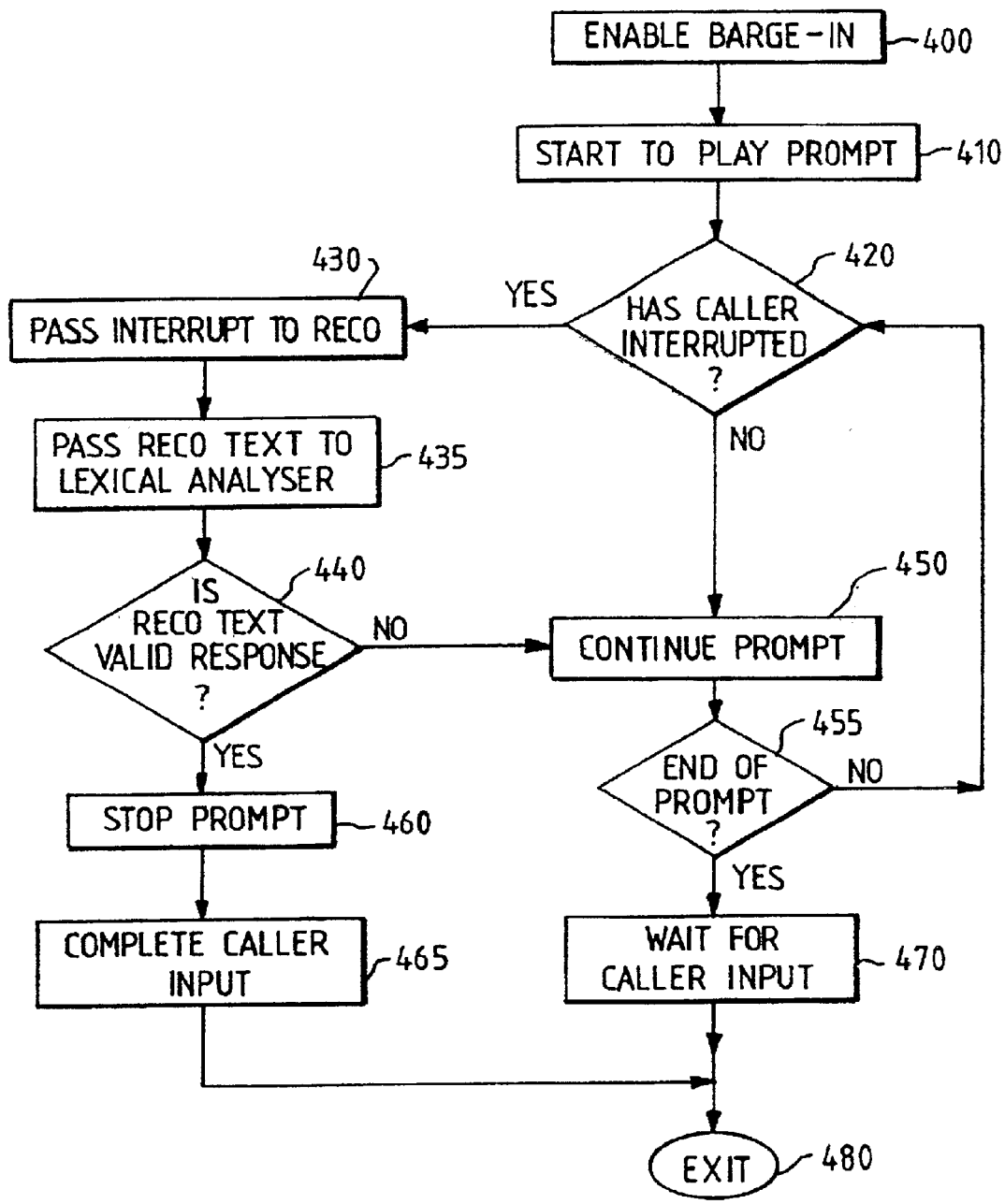
FIG. 2 is a schematic flow chart illustrating a method of operation of the system of FIG. 1.

The voice processing system 10 of FIG. 1 supports barge-in, in that the recognition system 185, 320 can be active for a line at the same time that a prompt is being played out on that line. This operation is shown in FIG. 2, where the application first enables barge-in (step 400), and then starts to play out a prompt to the caller (step 410). (It will be appreciated that in some circumstances it may not be desirable to permit caller barge-in; thus, the voice processing software 210 typically permits the application 220 to enable/disable this on a per prompt basis.)

The method then proceeds to step 420, in which a test is made to see if the caller has said anything. This test is generally performed by a voice activity detector, so that background tones and other extraneous noise will be discounted. If no spoken caller input is detected, then the play out of the prompt is continued (step 450), until the end of the prompt is reached (step 455). This effectively represents the end of the period of potential barge-in. The system then waits for caller input in conventional fashion (step 470). What happens next is not of direct interest to the present invention (hence the exit (step 480) in FIG. 2), but generally the caller will make some input which will be passed to the recognition unit; the voice processing system will then typically take some further action based on the recognized caller input. If no caller input is received within a predetermined period, the system will time out (not shown). The application may then choose perhaps to transfer the caller to a human agent, or to replay them the prompt; similar possibilities are also typically provided if the recognition on the caller input fails.

Returning now to step 430, this is reached where some spoken input from the caller is detected at step 420. The received voice signal is passed to the recognition device; note that at this stage the prompt play out continues. Once a response has been received from the recognition device, this is then passed to the lexical analyzer (step 435); note again that the prompt play out is still continuing at this point. (If the recognition fails, so that no recognition text is produced, the method can go direct from step 430 to step 450, effectively as per the prior art.)

The lexical analyzer tests the recognized text against a predetermined set of words or criteria (step 440) which will be described in more detail below. If the result of this test is positive, then the method proceeds to step 460, where output of the prompt is terminated. The remainder of the caller input is then detected (step 465), whereupon processing can proceed as described above, with the method terminating at step 480.

Thus, a form of barge-in has been effected. This is distinguished from that of the prior art, in that such barge-in occurs only when the lexical analyzer confirms that the recognized text is relevant to the needs of the application. In other words, barge-in requires not only that the caller interjection be successfully recognized, but also that it passes whatever criterion (or criteria) the lexical analyzer applies. This second step is particularly important, since the increasing use of large vocabulary systems in voice processing applications makes it ever more likely that the system will recognize some background or other remark at the caller end which is not a direct answer to the prompt. By being able to discriminate against such remarks or utterances, the robustness of the dialogue between the caller and the voice processing system is greatly enhanced.

In one embodiment, the lexical analyzer is provided with a predefined set of task words. The lexical analyzer then tests whether or not the recognized text includes one or more of the task words. If not, the caller input may not be relevant (yet) to the information required, and so the prompt play out is allowed to continue. Thus the prompt play out is only terminated when it is specifically confirmed that the caller input is likely to be a valid response to the prompt. Note that the predefined set of task words may vary from one prompt to another.

As an example, the first part of an application prompt may ask for an account code. A second part of the prompt may go on to state that the account code is printed top left on all statements. It is desirable to allow barge-in after the first part of the prompt, for those who already know their account code. In this case, the lexical analyzer is set up to match only digits. This will then exclude barge-in being triggered in circumstances where (for example) the telephone picks up the caller shouting "Dear, what is our account code", or mumbling to themselves "Where did I put this now". This avoids the prior art problem where barge-in is unintentionally activated by the caller, resulting in the dialogue being accidentally suspended in mid-air, with neither the caller nor the voice processing system knowing how to proceed.

Based on the above, the skilled person will be able to develop further possible criteria for use in the lexical analyzer. One variation is that rather than look for single task words, the lexical analyzer may look for particular word phrases or combinations, grammatical structures, etc. For example, in a product ordering application, a caller interruption starting: "I'd like" might trigger barge-in. Further, the lexical analyzer test may be inclusive or exclusive (i.e. the result may be arranged to be positive or negative, given the presence of certain features in the caller response).

It will be appreciated that the skilled person will be aware of many possible variations on the embodiment described above. For example, some systems may allow the caller to interrupt a prompt by pressing a DTMF key. This would then be detected at step 420 in FIG. 2, and the system could take whatever action is required. (Note that it is quite possible for the voice processing system to support input by both DTMF key and by speech, whichever the caller happens to choose.) Another possibility is for step 420 to be eliminated altogether, and replaced by step 430 (the flow would then be from step 410 to step 430 to step 435 to step 440 to either step 450 or step 460 as appropriate, with a negative result from step 455 returning to step 430). In other words, all input would be passed to the recognizer; during silence, the recognized text would be blank, and this would not be considered a valid response, so that processing would then pass to step 450. This approach avoids the use of a voice activity detector, but ties up a recognition channel from the moment the outgoing prompt is started, rather than from the moment that a positive caller response is detected. Since recognition resources tend to be expensive, this approach is therefore likely to be more costly than the approach depicted in FIG. 2. One enhancement to the approach of FIG. 2 is to use acoustic parameters in addition to the lexical analysis to determine the relevance of the caller input (and hence whether or not to effect barge-in). The analysis of the acoustic parameters can be performed in parallel with the speech recognition and/or the lexical analysis, typically by some DSP unit provided in the voice processing system (e.g., card 180 in FIG. 1). One example of an acoustic parameter which can be considered is volume: if this is low or highly variable, then this may be an indication that the caller is speaking away from the microphone, and therefore not directly answering the prompt (hence barge-in should not be effected). There may also be some variation in timbre or other acoustic property such as spectral distribution if the caller's mouth moves further away from the speaker, providing another indication that the caller is not directly answering the prompt.

A further possibility is to try to perform some form of speaker identification, for example by estimating the vocal tract of the speaker from the fundamental frequency and formats of the incoming audio signal, and checking that the audio input is indeed coming from the caller. Thus a change in speaker may indicate that the input is being picked up from a background or secondary speaker, and so is not intended as an answer to the prompt (i.e. no barge-in). There may also be multiple voices, the so-called "cocktail party" effect, whereby the system can try to eliminate background contributions, and focus solely on the input from the caller.

Various techniques for speaker identification/recognition are discussed in "Fundamentals of Speech Signal Processing" by Saito and Nakata, Academic Press, 1985, and "Vowel Perception and Production" by Rosner and Pickering, Oxford University Press, 1994.

Note that such acoustic parameters in most cases will not be solely determinative of whether or not to provide barge-in, but can provide useful auxiliary information. For example, it may be decided to continue the prompt (i.e. to refrain from effecting barge-in) if there are no particular recognized task words, and if this is backed up by some acoustic indication of non-pertinent input, such as a change in volume. The use of acoustic parameters to help determine whether or not to effect barge-in will generally increase the cost and complexity of the voice processing system, but may enhance the robustness of the overall solution.

Reviewing now the system shown in FIG. 1, it will be appreciated that the recognition system and/or the lexical analyzer may not be included in the voice processing system of the invention, but rather may be supplied by some external componentry. Alternatively, the recognition system and/or the lexical analyzer may be part of or integral to the voice processing system. The lexical analyzer may be included as part of the user application 220. It is also possible for the barge-in facility (with or without the lexical analyzer) to be essentially incorporated within a recognition system.

Furthermore, although the system of the present invention has been described primarily in terms of a telephony environment, it is not so limited. For example, it might be included in an automatic kiosk, or in an in-car navigation and control unit. It will therefore be recognized that the system of the present invention may find utility in a great variety of voice processing applications.

Although the present invention and its advantages have been described in detail, it should be understood that various changes, substitutions and alterations can be made herein without departing from the spirit and scope of the invention as defined by the appended claims.

What is claimed is:

1. A method of providing speech recognition with barge-in for a voice processing system comprising the steps of:

playing out a prompt to a user;

receiving audio input from the user while said prompt is still being played out;

performing speech recognition on said audio input to determine a corresponding text;

performing lexical analysis on said text to determine whether the text satisfies one or more conditions which reflect a relevant user response to said prompt; and responsive to said text satisfying said one or more conditions, terminating the playing out of the prompt;

otherwise, continuing the playing out of said prompt.

2. The method of claim 1, further comprising the step, responsive to said step of continuing the playing out of said prompt, of discarding said text.

3. The method of claim 1, wherein said step of performing lexical analysis to determine whether the text satisfies one or more conditions comprises the step of scanning the text to see if it contains one or more predetermined words.

4. The method of claim 3, wherein said one or more predetermined words are specific to the particular prompt being played out.

5. The method of claim 1, in which said voice processing system and said user communicate with each other over a telephone network, whereby the prompt is played out over a telephone connection, and said audio input is received back over the telephone connection.

6. The method of claim 1, further comprising the step of using one or more acoustic parameters of the audio input to assist determining whether to continue or to terminate playing out of said prompt.

7. The method of claim 1, further comprising the step of determining if said audio input is speech input, and wherein if said audio input is speech input, said step of performing speech recognition comprises performing speech recognition on said speech input to determine a corresponding text.

8. A voice processing system for providing speech recognition with barge-in, said voice processing system comprising:

means for playing out a prompt to a user;

means for receiving audio input from the user while said prompt is still being played out;

means for performing speech recognition on said audio input to determine a corresponding text;

means for performing lexical analysis on said text to determine whether the text satisfies one or more conditions which reflect a relevant user response to said prompt;

means responsive to said text satisfying said one or more conditions, for terminating the playing out of the prompt and;

otherwise, means for continuing the playing out of said prompt.

9. The voice processing system of claim 8, wherein said means for performing lexical analysis to determine whether the text satisfies one or more conditions comprises means for scanning the text to see if it contains one or more predetermined words.

10. The voice processing system of claim 9, wherein said one or more predetermined words are specific to the particular prompt being played out.

11. The voice processing system of claim 8, in which said voice processing system and said user communicate with each other over a telephone network, whereby the prompt is played out over a telephone connection, and said audio input is received back over the telephone connection.

12. The voice processing system of claim 8, wherein said means for receiving caller input includes a voice activity detector for discriminating between speech input and other forms of tone or noise input.

13. The voice processing system of claim 8, further comprising means for calculating one or more acoustic parameters of the audio input to assist determining whether to continue or to terminate playing out of said prompt.

14. The voice processing system of claim 8, further comprising the means, responsive to said means of continuing the playing out of said prompt, for discarding said text.

15. A computer readable medium containing computer program instructions for a voice processing system for providing speech recognition with barge-in, said computer program instructions comprising instructions for:

playing out a prompt to a user;

receiving audio input from the user while said prompt is still being played out;

performing speech recognition on said audio input to determine a corresponding text;

performing lexical analysis on said text to determine whether the text satisfies one or more conditions which reflect a relevant user response to said prompt;

responsive to said text satisfying said one or more conditions, terminating the playing out of the prompt and;

otherwise, continuing the playing out of said prompt.

16. The computer readable medium of claim 15, wherein said instruction of performing lexical analysis to determine whether the text satisfies one or more conditions comprises the instruction of scanning the text to see if it contains one or more predetermined words.

17. The computer readable medium of claim 16, wherein said one or more predetermined words are specific to the particular prompt being played out.

18. The computer readable medium of claim 15, in which said voice processing system and said user communicate with each other over a telephone network, whereby the prompt is played out over a telephone connection, and said audio input is received back over the telephone connection.

19. The computer readable medium of claim 15, further comprising the instruction of using one or more acoustic parameters of the audio input to assist determining whether to continue or to terminate playing out of said prompt.

20. The computer readable medium of claim 15, further comprising the instruction, responsive to said instruction of continuing the playing out of said prompt, of discarding said text.

21. A voice processing system for providing speech recognition with barge-in, said voice processing system comprising:

circuitry for playing out a prompt to a user;

circuitry for receiving audio input from the user while said prompt is still being played out;

circuitry for performing speech recognition on said audio input to determine a corresponding text;

circuitry for performing lexical analysis on said text to determine whether the text satisfies one or more conditions which reflect a relevant user response to said prompt;

circuitry responsive to said text satisfying said one or more conditions, for terminating the playing out of the prompt and;

otherwise, circuitry for continuing the playing out of said prompt.

22. The voice processing system of claim 21, further comprising circuitry, responsive to said circuitry of continuing the playing out of said prompt, for discarding said text.

23. The voice processing system of claim 22, wherein said circuitry for performing lexical analysis to determine whether the text satisfies one or more conditions comprises circuitry for scanning the text to see if it contains one or more predetermined words.

24. The voice processing system of claim 23, wherein said one or more predetermined words are specific to the particular prompt being played out.

25. The voice processing system of claim 24, in which said voice processing system and said user communicate with each other over a telephone network, whereby the prompt is played out over a telephone connection, and said audio input is received back over the telephone connection.

26. The voice processing system of claim 25, wherein said circuitry for receiving caller input includes a voice activity detector for discriminating between speech input and other forms of tone or noise input.

27. The voice processing system of claim 26, further comprising circuitry for calculating one or more acoustic parameters of the audio input to assist determining whether to continue or to terminate playing out of said prompt.

* * * * *